(No Model.)   2 Sheets—Sheet 1.

C. H. FISHER.
JOURNAL AND BEARING.

No. 352,403.   Patented Nov. 9, 1886.

WITNESSES:
Henry O. Brooks
George M. Poore

INVENTOR:
Charles H. Fisher

UNITED STATES PATENT OFFICE.

CHARLES H. FISHER, OF LOWELL, MASSACHUSETTS.

JOURNAL AND BEARING.

SPECIFICATION forming part of Letters Patent No. 352,403, dated November 9, 1886.

Application filed May 8, 1886. Serial No. 201,532. (No model.)

*To all whom it may concern:*

Be it known that I, CHARLES H. FISHER, a citizen of the United States, residing at Lowell, in the county of Middlesex and State of Massachusetts, have invented a new and useful Improvement in Journals and Bearings, of which the following is a specification.

My invention is especially useful when used with journals around which the bearing revolves, although it may be used under other conditions; and the object thereof is to furnish means for maintaining journals and bearings in a thoroughly-lubricated condition and to avoid the necessity of frequently supplying oil or other lubricating material thereto by preventing the lubricant from escaping.

Figure 1:
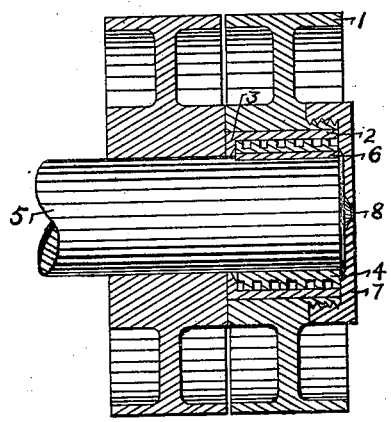
Figure 2:
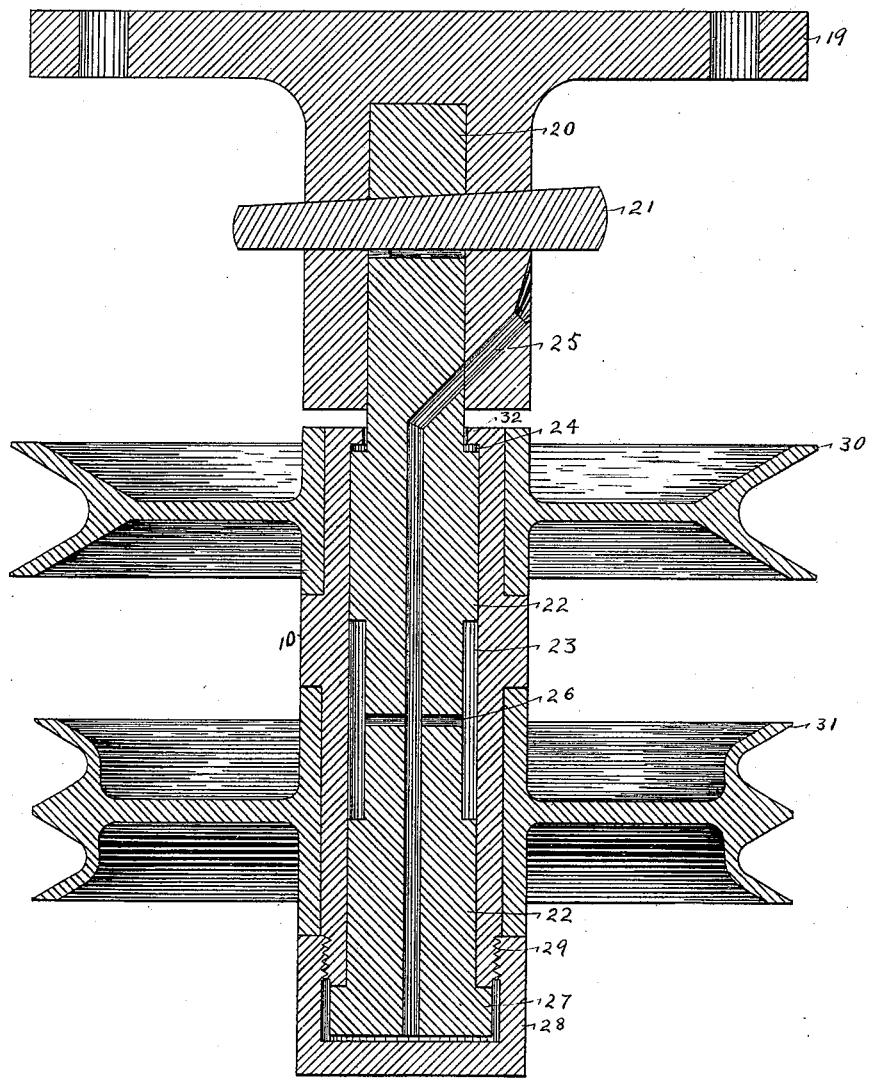

My invention is illustrated in the accompanying drawings, in which Figure 1 is an elevation, partly in central vertical section, of a shaft provided with a loose and a tight pulley; and Fig. 2 is a central vertical section of a small hollow counter-shaft which is intended to be fastened to the ceiling of a room and to transfer power in different directions by means of belts which run upon the pulleys thereon, and which is provided with the new means of preventing the lubricant from escaping.

Similar reference-numbers refer to similar parts in the drawings.

In Fig. 1 the loose pulley 1 is provided with one of the forms in which I apply the invention, and in that view the loose pulley is shown as being provided with a cylindrical bushing, 2, which tightly fits within the central hole in the hub of the pulley. The bushing 2 is provided with the inwardly-projecting lip, 3, that overhangs the sleeve 4, which is held upon the shaft 5 by means of the key 6 or other suitable means.

To the hub of the pulley 1 is fastened, by being screwed thereto or otherwise, the cap 7, which is provided with the central oiling-hole, 8. The outer surface of the sleeve 4 is preferably provided with a groove or grooves of considerable depth, within which a considerable amount of lubricant may be stored, although this construction is not necessary in all cases. If this loose pulley be rapidly revolved and oil be fed within the hole 8, the oil will be immediately thrown outward by centrifugal force as far as it can go—that is, to the interior of the bushing 2, where it will evenly distribute itself over the whole of the said interior, thoroughly lubricating the same. The oil cannot escape from the interior of the bushing 2 until a very considerable amount has been fed into the hole 8, since it is prevented from doing so by the inwardly-projecting lip 3 and the similar inwardly-projecting lip formed by the cap 7. When my invention is used in such circumstances as would be found in such a structure as is shown in Fig. 1, I prefer to make the central hole, 8, small, although the said hole may be made as large as the hole in the lip 3 upon the bushing 2, if so desired. I also prefer in such structures to retain the loose pulley 1 in the proper longitudinal position upon the shaft by means of the lip 3 and the cap 7, which bear upon each end of the sleeve 4, and to prevent the said cap and lip from coming in contact therewith, except near their outer portions, as shown. By this means the bearing-surface of the said cap and lip upon the ends of the sleeve 4 will be lubricated as long as there is any considerable amount of lubricant within the bearing.

The structure shown in Fig. 2 is provided with a lubricant-retaining device that is similar to that shown in Fig. 1, and this structure may be used with the axis of its journal in either a vertical or a horizontal position or in any intermediate position. In this case the stand 19, which is intended to be bolted to some part of a building, supports the journal 20, the said journal being fixed in the stand by means of the key 21 or other equivalent means. The bearing portion 22 of the journal 20 is made larger than the remaining portions thereof, as shown, for the same reasons that the bearing-surface upon the shaft 5 was enlarged by having the sleeve 4 applied to the shaft.

The weight of the revolving parts of the device are borne, when the device is used in a vertical position, by the enlargement 27, which also serves to limit the endwise motion of the said revolving parts. The journal 20 is shown as made in a single piece, although it may be made in several pieces, if it is desirable at any time to do so. I prefer to form one or more oil-chambers in the surface of this form of bearing, such as are shown at 23, although these are not essential to the successful working of the journal and bearing.

I prefer, whenever it can be done, to supply oil to the interior of the bearing through a conduit, such as 25, that leads to the interior of the bearing from the space exterior to the bearing and through the substance of the journal, sometimes providing the conduit with side branches, 26, which lead to different portions of the interior surface of the bearing, although these details are not essential to the securing of a good result.

The hollow revolving bearing 10, which supports the pulleys 30 and 31, is provided with the inwardly-projecting lip 32, which prevents oil from escaping at this point. I prefer to make the hole in the lubricant-retaining lip somewhat larger than the small part of the journal which it surrounds, as shown at 32, although it may sometimes fit upon the journal, as shown at 3 in Fig. 1.

I sometimes make the parts of such dimensions that the lubricant may be introduced directly between the journal and the lubricant-retaining lip, and dispense with all other means of introducing the lubricant, and I always prefer to make the lubricant-retaining lip at one end of the bearing an unperforated cap, like 28, when it is possible to do so.

It is not essential that the grooves in the enlarged bearing-surface of the journal should be of any particular form or shape, as they are introduced mainly for the purpose of storing a considerable quantity of lubricant, and they may be made of any convenient form or shape. In Fig. 1 these grooves are shown as formed by cutting a square screw-thread upon the surface of the sleeve 4, while in Fig. 2 the same purpose is effected by cutting a plain circular groove in the bearing-surface of the journal. Any other convenient method of forming these grooves in the bearing-surface of the journal may be equivalently adopted.

It will be noticed that in the bearings illustrated any lubricant which may be within the bearing will be always evenly distributed over the interior surface thereof when it is revolving, being held there by centrifugal force, while at the same time all parts of the rubbing-surfaces will be lubricated when there is enough lubricant for the purpose, since the oil spreads itself over the interior of the bearing in a film which has a tendency to maintain itself equally thick over the whole surface thereof. When these bearings revolve upon their journals at very high speeds, it is necessary to prevent oil from escaping through all joints leading to the interior of the bearing at its outer circumference—such as the joint between the cap 7 and the pulley-hub, the joint 29, and sometimes such joints as that between the outer surface of the bushing 2 and the hub which supports it. This may be effected by any ordinary means of stopping liquids under pressure from flowing through such joints; but I have usually found it desirable to stop this flow by means of a cement—such as that formed by mixing litharge and glycerine to the consistency of a thick cream—applied between the joints. The inwardly-projecting lips which prevent oil from escaping from these bearings may be formed and connected to the bearing in any suitable manner—such as being made a part of the bearing, as shown in Fig. 2 at 32, fastened to the bearing-support, as at 7 in Fig. 1, fastened to the piece which lines the bearing, as at 3 in Fig. 1, or in any other suitable and convenient way.

I am aware that it is not new to provide a tapering journal with a bearing which has an inwardly-projecting lip at each end, where the said bearing and lips are made in a single piece and slipped into place upon the journal over the end thereof, and I do not claim such a structure as of my invention. Such a structure as this is illustrated in Patent No. 134,725, which was issued to Bower. It is not possible to make such a bearing fit its journal with what is known among skilled mechanists as a "running fit," because the interior diameter of the main portion of such a bearing must be larger than the journal upon which it works by an amount which is twice the distance which the larger of the inwardly-projecting lips projects from the interior surface of the said bearing. As this construction would make the journal and its bearing come in contact with each other over but a very small surface, the pressure upon the surface of contact would be very great, and, as is well known, such journals rapidly wear out on account of the lubricant being squeezed out from between the rubbing surfaces. Such loosely-fitting bearings are also entirely unsuitable for use where the bearing revolves at a great velocity upon the journal, since a very violent and destructive vibration of the bearing is then sure to be set up. These difficulties are entirely removed by the use of what I claim to be of my invention.

What I claim as new, and desire to secure by Letters Patent, is—

1. A journal having an enlarged bearing-surface, and having a bearing that is in its largest interior diameter impervious to oil, closely fitting and revolving upon the said enlarged bearing-surface, there being an inwardly-projecting oil-impervious lip at each end of the said bearing, which overhangs the said enlarged bearing-surface, and the journal having means entirely between the said lips for closely limiting the longitudinal motion of the said bearing, substantially as described, and for the purposes set forth.

2. A journal having an enlarged bearing-surface that is provided with a lubricant-storing groove, and also having a bearing that is in its largest interior diameter impervious to oil, closely fitting and revolving upon the said enlarged bearing-surface, and that is provided with an inwardly-projecting oil-impervious lip at each end, which overhangs the said enlarged bearing-surface, substantially as set forth, and for the purposes specified.

3. A journal having an enlarged bearing-surface, and having a bearing that is in its largest interior diameter impervious to oil, closely fitting and revolving thereon, the said bearing having an inwardly-projecting lip at each end, which overhangs the said enlarged bearing-surface, and the said journal having means entirely between the said lips for closely limiting the longitudinal motion of the said bearing, and a lubricant-conduit leading from the space exterior to the said bearing through the said journal to the interior of the said bearing, substantially as described, and for the purposes set forth.

4. A journal having an enlarged bearing-surface that is provided with a lubricant-storing groove, and also having a bearing that is in its largest interior diameter impervious to oil, closely fitting and revolving upon the said enlarged bearing-surface, and that is provided with an inwardly-projecting oil-impervious lip at each end, which overhangs the said enlarged bearing-surface, the said journal having means entirely between the said lips for closely limiting the longitudinal motion of the said bearing, and a lubricant-conduit leading from the space exterior to the said bearing through the said journal to the interior of the said bearing, substantially as described, and for the purposes specified.

5. A detachable journal having an end which projects beyond the bearing-surface thereof, and that is smaller than the said bearing-surface, and means for securing the said journal to a suitable support therefor, and provided with a bearing that is in its largest interior diameter impervious to oil, closely fitting and revolving upon the said bearing-surface, and that has an inwardly-projecting oil-impervious lip at each end, which overhangs the said bearing-surface, substantially as described, and for the purposes set forth.

CHARLES H. FISHER.

Witnesses:
HENRY O. BROOKS,
GEORGE W. POORE.